(12) United States Patent
Baker et al.

(10) Patent No.: US 12,157,410 B2
(45) Date of Patent: Dec. 3, 2024

(54) WINDING ASSEMBLY AND RATCHET SPOOL

(71) Applicant: LOADHOG LIMITED, Sheffield (GB)

(72) Inventors: Martin Baker, Sheffield (GB); Luke Davis, Sheffield (GB)

(73) Assignee: LOADHOG LIMITED (GB)

( * ) Notice: Subject to any disclaimer, the term of this patent is extended or adjusted under 35 U.S.C. 154(b) by 27 days.

(21) Appl. No.: 17/768,258

(22) PCT Filed: Nov. 6, 2020

(86) PCT No.: PCT/IB2020/060452
§ 371 (c)(1),
(2) Date: Apr. 12, 2022

(87) PCT Pub. No.: WO2021/090253
PCT Pub. Date: May 14, 2021

(65) Prior Publication Data
US 2024/0025330 A1    Jan. 25, 2024

(30) Foreign Application Priority Data

Nov. 5, 2020 (GB) ................................. 1916180
Nov. 5, 2020 (GB) ................................. 2017515

(51) Int. Cl.
*B60P 7/08* (2006.01)
*B60P 7/10* (2006.01)
*B65D 71/00* (2006.01)

(52) U.S. Cl.
CPC .............. *B60P 7/083* (2013.01); *B60P 7/10* (2013.01); *B65D 71/0096* (2013.01)

(58) Field of Classification Search
CPC ........ B60P 7/083; B60P 7/0853; B60P 7/0846
See application file for complete search history.

(56) References Cited

U.S. PATENT DOCUMENTS

| 4,962,901 | A | 10/1990 | Shirley et al. | |
| 8,974,159 | B1 | 3/2015 | Ammann | |
| 2003/0145434 | A1* | 8/2003 | Lin | B60P 7/0823 24/68 CD |
| 2008/0014037 | A1* | 1/2008 | Facey | B60P 7/083 410/35 |

(Continued)

FOREIGN PATENT DOCUMENTS

| EP | 1289850 B1 | 3/2003 |
| EP | 1628889 B1 | 3/2006 |

(Continued)

*Primary Examiner* — Sang K Kim
*Assistant Examiner* — Nathaniel L Adams
(74) *Attorney, Agent, or Firm* — Clark Hill PLC; James R. Foley

(57) ABSTRACT

A ratchet spool (59) for use in a winding assembly (16) is disclosed. The ratchet spool (59) is rotatable about a principal axis (61). The ratchet spool (59) comprises a main part (20) and a plurality of ratchet teeth (60) arranged circumferentially around the main part (20). The ratchet teeth (60) are engageable by a ratchet arrangement (18) for driving the ratchet spool (59) in a driving direction about said principal axis (61). The ratchet spool (59) also has a drive formation (21) for driving the ratchet spool (59) in said driving direction.

18 Claims, 15 Drawing Sheets

(56) References Cited

U.S. PATENT DOCUMENTS

| | | | |
|---|---|---|---|
| 2008/0263837 A1* | 10/2008 | Cumbers | B60P 7/083 24/68 CD |
| 2009/0100653 A1 | 4/2009 | Wang | |
| 2010/0132169 A1 | 6/2010 | Wang | |
| 2014/0008593 A1* | 1/2014 | Kingery | B60P 7/083 254/376 |
| 2016/0347233 A1* | 12/2016 | Kingery | B60P 7/0846 |
| 2018/0179018 A1* | 6/2018 | Henderson | B60P 7/083 |
| 2020/0039418 A1 | 2/2020 | Willodson | |

FOREIGN PATENT DOCUMENTS

| | | |
|---|---|---|
| GB | 2402380 A | 12/2004 |
| WO | 2018/131364 A1 | 7/2018 |

* cited by examiner

WINDING ASSEMBLY AND RATCHET SPOOL

This invention relates to winding assemblies. More particularly, but not exclusively, this invention relates to tightening arrangements incorporating winding assemblies. This invention also relates to ratchet spools for use in winding assemblies. In addition, this invention relates to lids incorporating such winding assemblies.

It is known to load goods on pallets. Lids can be mounted on the loads. Such lids are provided with straps to tighten the lid against the load. The lids include tightening mechanisms, operated by levers, to tighten the strap, thereby pulling the lid against the load. In some situations, using the tightening mechanisms by operating the levers can be time consuming.

According to one aspect of this invention, there is provided a winding assembly comprising:
- a ratchet spool rotatable about a principal axis, said ratchet spool having a main part and a plurality of ratchet teeth arranged circumferentially around the main part;
- a tensioning arrangement through which an elongate tensioning member can extend;
- a transmission arrangement between the ratchet spool and the tensioning arrangement;
- wherein the ratchet spool has a first attaching formation to attach the transmission arrangement to the ratchet spool, and the tensioning arrangement has a second attaching formation to attach the transmission arrangement to the tensioning arrangement; and
- a ratchet arrangement to engage the ratchet teeth of the ratchet spool and rotate the ratchet spool in a driving direction about said principal axis;
- wherein rotation of the ratchet spool in said driving direction is transmitted by the transmission arrangement to the tensioning arrangement to drive the tensioning arrangement rotatably in a winding direction to wind the elongate tensioning member around the tensioning arrangement;
- characterised in that the ratchet spool has a drive formation for driving the ratchet spool in said driving direction.

According to another aspect of this invention, there is provided a ratchet spool for use in a winding assembly, said ratchet spool being rotatable about a principal axis, and said ratchet spool comprising:
- a main part;
- a plurality of ratchet teeth arranged circumferentially around the main part, the teeth being engageable by a ratchet arrangement for driving the ratchet spool in a driving direction about said principal axis; and
- a drive formation for driving the ratchet spool in said driving direction.

According to another aspect of the invention, there is provided a lid comprising:
- a body;
- an elongate tensioning member within the body, the elongate tensioning member being movable between a retracted condition in which the elongate tensioning member is retracted within the body, and an extended condition in which the elongate tensioning member extends from the body; and
- a winding assembly as described above operable on the elongate tensioning member.

The winding assembly may constitute a tightening assembly for tightening the elongate tensioning member. The tightening assembly may tighten the elongate tensioning member when the elongate tensioning member is secured to a pallet.

The tensioning arrangement may comprise a slotted member. The elongate tensioning member may comprise a strap.

The drive formation may be spaced from the ratchet teeth. The drive formation may be provided on the principal axis. The drive formation may extend along said principal axis. The drive formation may comprise a recess defined within the main part. The drive formation may have an axis, which may extend co-axially with the principal axis. The axis of the drive formation may extend co-linearly with the principal axis.

The recess may be a polygonal recess. The recess may be configured to receive a tool, which may be a driver, such as a key. The driver may be a polygonal driver, having a polygonal end profile.

The tool may be an electric tool capable of rotating the driver. The recess may be a hexagonal recess or other suitable shape, such as star shaped. The driver may be a hex driver, a star shaped driver or any other suitably shaped driver.

The transmission arrangement may comprise a linkage, which may comprise a flexible elongate linkage, such as a wire, cable or wire rope.

The first attaching formation may comprise a first annular groove formation defined by the main part. The first annular groove formation may extend circumferentially around the main part.

The linkage may be received in the first annular groove formation when the ratchet spool is rotated in the driving direction. The linkage may be wound around the first annular groove formation when the ratchet spool is rotated in the driving direction.

The first attaching formation may include a bore defined by the ratchet spool. The bore may be a through bore. The bore may be defined by the main part.

The bore may open into the first annular groove formation. The transmission arrangement may be received in the bore to attach the transmission arrangement to the ratchet spool.

The ratchet teeth may be spaced circumferentially around the main part. The ratchet teeth may extend radially from the main part. The main part may be substantially cylindrical.

The main part may include a toothed portion and a base portion. The ratchet teeth may be provided on the toothed portion.

The base portion may be provided at one end of the toothed portion. The first attaching formation may be defined between the toothed portion and the base portion.

The second attaching formation may comprise a second annular groove formation. The linkage may extend around the second annular groove formation.

The linkage may be wound around the second annular groove formation. The linkage may be unwound from around the second annular groove formation when the tensioning arrangement is rotated in the winding direction.

The ratchet arrangement may comprise an operating member. The ratchet arrangement may comprise a pawl to engage the ratchet teeth. The operating member may effect movement of the pawl into engagement with the ratchet teeth.

The operating member may comprise a lever. The lever may be pivotally movable about the principal axis.

The operating member may be movable from an inoperative position to an operative position. Movement of the operating member from the inoperative position to the operative position causes the ratchet arrangement to engage the ratchet teeth.

The winding assembly may include a first return element for returning the operating member to the inoperative position. The first return element may comprise a first coil spring.

The winding assembly may further include a second return element for rotating the tensioning arrangement in the opposite direction to the winding direction. The second return element may comprise a second coil spring.

The drive formation may be a recess defined axially by the main part of the ratchet spool.

Alternatively, the main part may define a through hole. The base portion may define a central aperture aligned with the through hole.

The ratchet spool may include a drive member. The drive member may extend through the hole.

The drive member may also extend through the aperture. The drive member may comprise a bolt. The drive member may define the drive formation.

The drive member may have a head defining the recess. The drive member may have a shaft.

The ratchet spool may include a fastening member arranged on the drive member to secure the drive member to the main part. The fastening member may be arranged on the shaft.

The fastening member may comprise a nut. The shaft may be threaded. The nut may be screwed onto the shaft of the drive member.

The tool may cooperate with the drive formation defined by the fastening member to rotate the ratchet spool.

At least one embodiment of the invention will now be described by way of example only, with reference to the accompanying drawings, in which.

Figure 1:
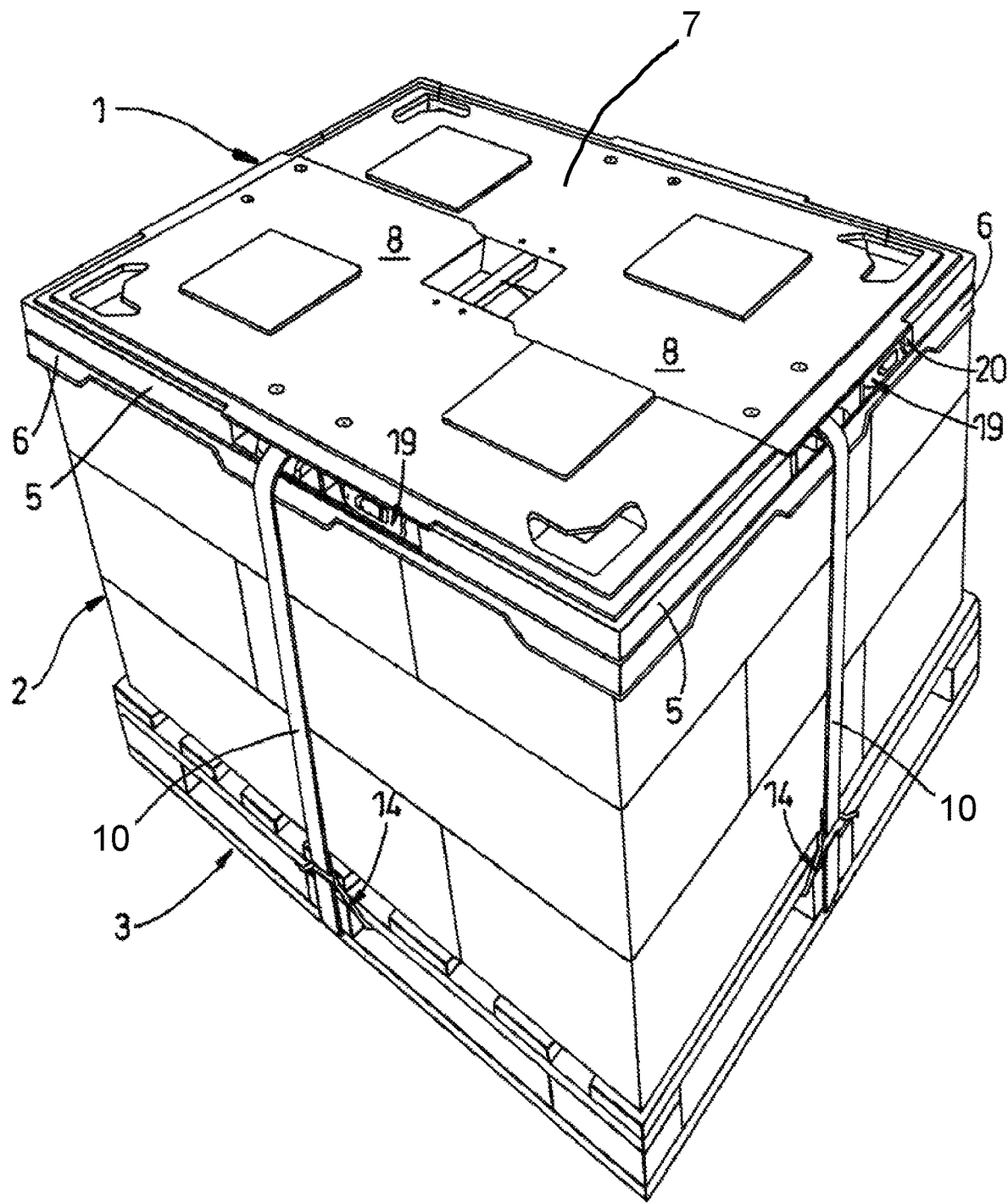
FIG. 1 is a perspective view of a lid in use on a load.

FIG. 1 shows a lid 1 for securing a load 2 on a pallet 3. The lid 1 comprises a body 4 with upstanding sides 5 and depending skirt 6 for embracing the top sides of the load (and also enabling a plurality of the lids 1 to be nested with each other or with pallets).

The body 4 comprises an upper portion 7 shown formed by two plastics mouldings 8, but which could be formed as a single moulding. The body 4 further includes a lower portion 9 formed by a main plastics moulding.

The lid 1 includes four elongate tensioning members in the form of straps 10. Each strap 10 is movable between a retracted condition within the upper portion 7, and an extended condition in which the strap 10 extends from the upper portion 7. Each strap 10 is provided at a respective side of the lid 1.

Each strap 10 has a distal end to which a hook 14 is attached. In the extended condition of the straps 10, the hooks 14 can be secured to the pallet 3. Each strap 10 also has a proximal end attached to a drum 12.

Urging means (not shown), in the form of a spring, urges the drum 12 in a direction to wind the strap 10 thereon, to move the strap 10 to its retracted condition.

Only two of the straps 10 are visible in FIG. 1, extending from two of the sides of the body 4. The skilled person will realise that the other two straps 10 extend from the other two sides.

When the hooks 14 are secured to the pallet 3, the straps 10 can be tensioned by the use of respective winding assemblies 16 operable on each strap 10. Each winding assembly 16 is provided within the body 4.

Figure 2:
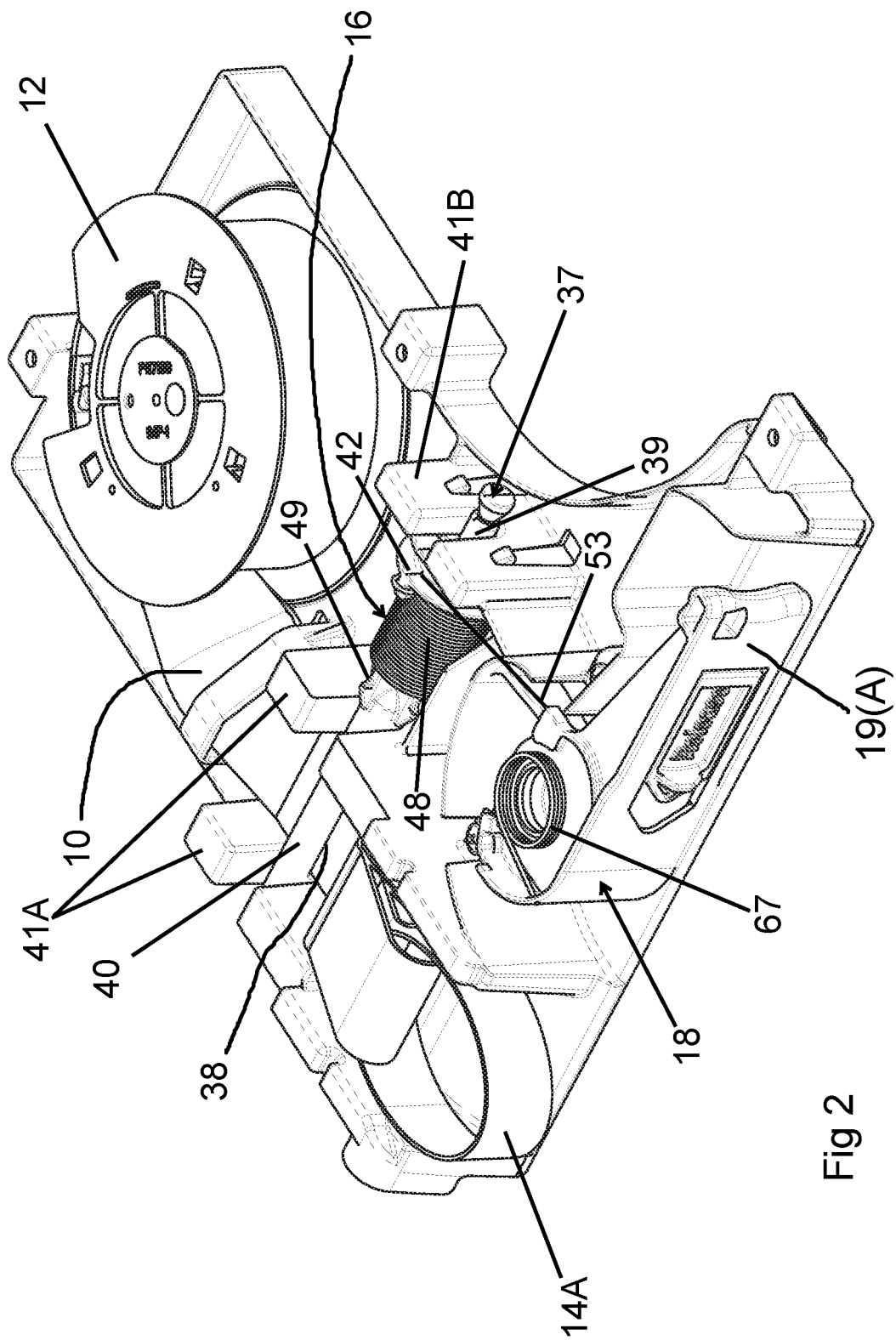
FIG. 2 is a perspective view of a winding assembly for use in the lid shown in FIG. 1.
Figure 3:
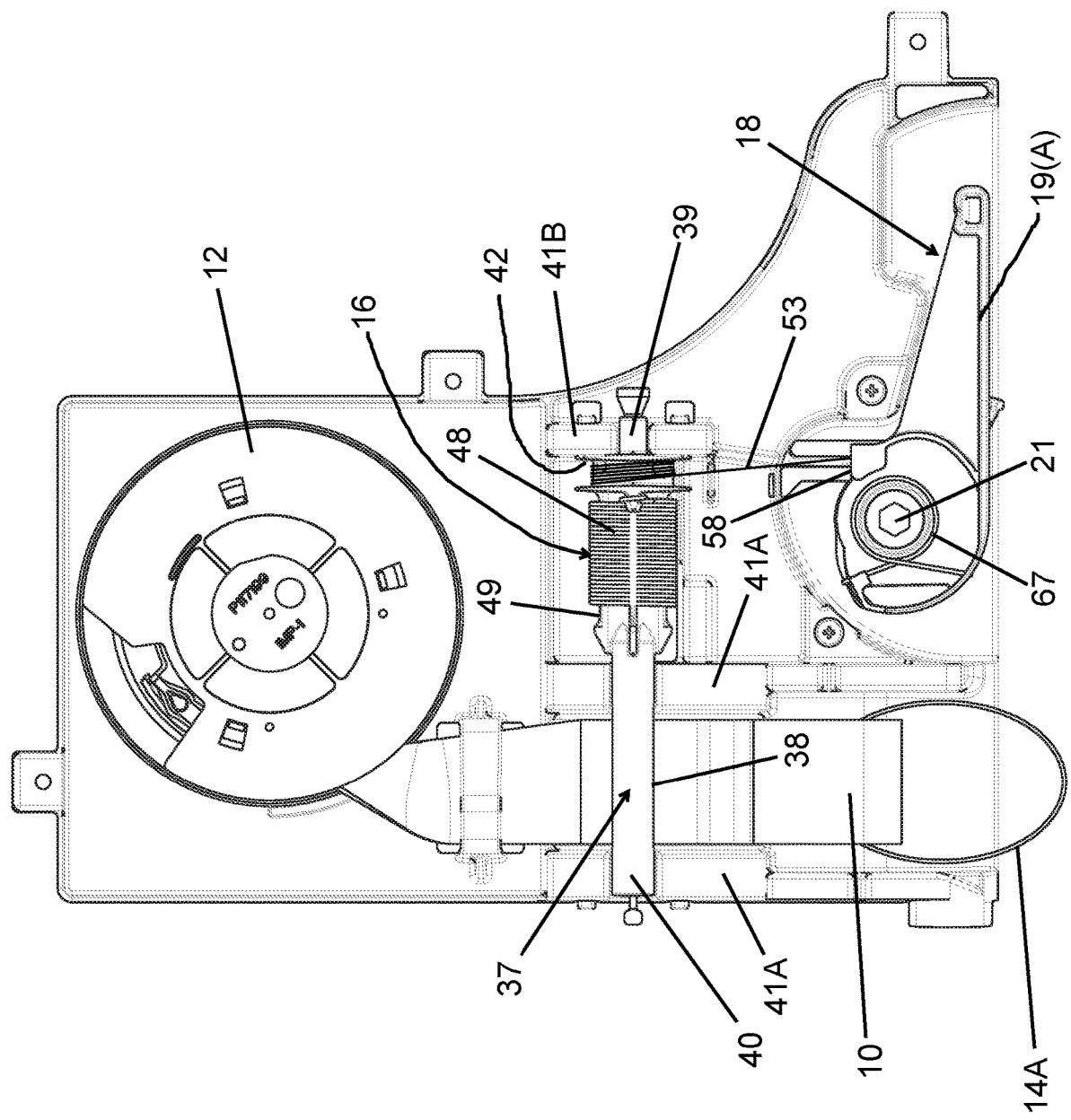
FIG. 3 is a plan view of the winding assembly.

Each winding assembly 16 comprises a tensioning arrangement in the form of a slotted member 37 (see FIGS. 2 and 3). The slotted member 37 is rotatably mounted on the body 4.

The slotted member 37 is rotatable by operation of a ratchet arrangement 18 comprising an operating member in the form of a lever 19.

FIGS. 2 and 3 show a loop 14A attached to the strap 10. It will be appreciated that the loop 14A could be replaced by the hook 14, or other suitable feature.

The winding assembly 16 further includes a ratchet spool 59 mounted on the lever 19 in alignment with the principal axis 61. The ratchet arrangement 18 is operable on the ratchet spool 59 to rotate the ratchet spool 59, as explained below.

The ratchet spool 59 has a substantially cylindrical main part 20 and a plurality of ratchet teeth 60 extending outwardly from the main part 20.

The main part 20 further includes a base portion 25 and a toothed portion 27. The ratchet teeth 60 are provided on the toothed portion.

The base portion 25 is provided at one end of the toothed portion 27. A first attaching formation in the form of a first annular groove formation 58 is defined between the toothed portion 27 and the base portion 25.

The ratchet spool 59 (see FIGS. 5, 6, 7 and 15 to 18) has a plurality of ratchet teeth 60 extending outwardly from the main part 20. The ratchet teeth 60 are provided between the first annular groove formation 58 and the opposite end of the main part 20.

Figure 4:
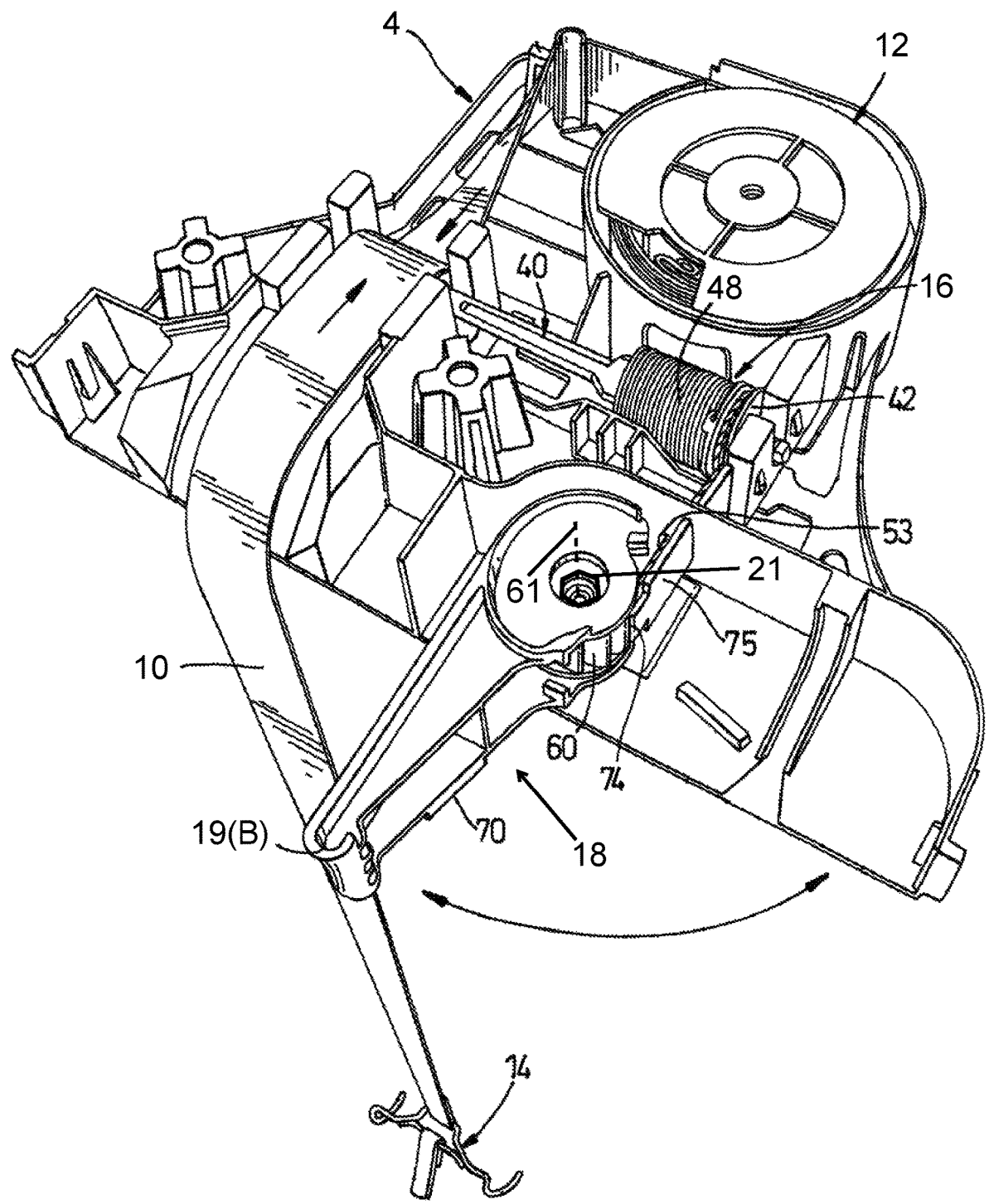
FIG. 4 shows the winding assembly in use, in which an elongate tensioning member is attached to a pallet.
Figure 6:
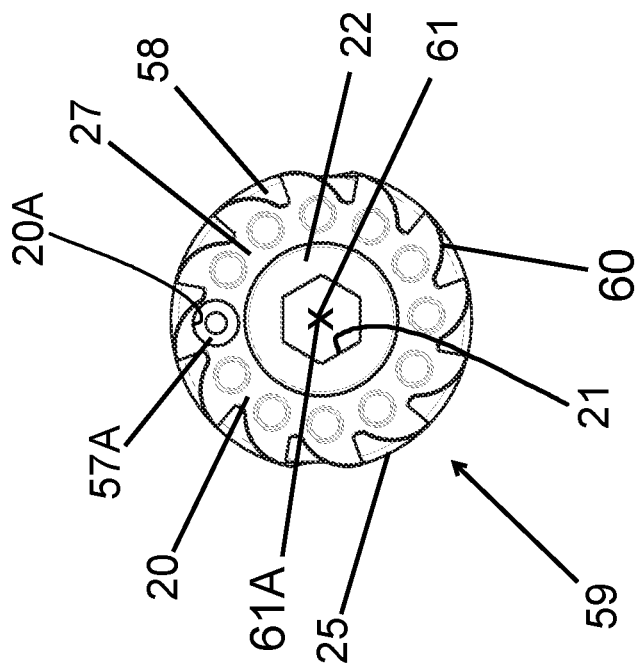
FIG. 6 is a top plan view of the ratchet spool.
Figure 5:
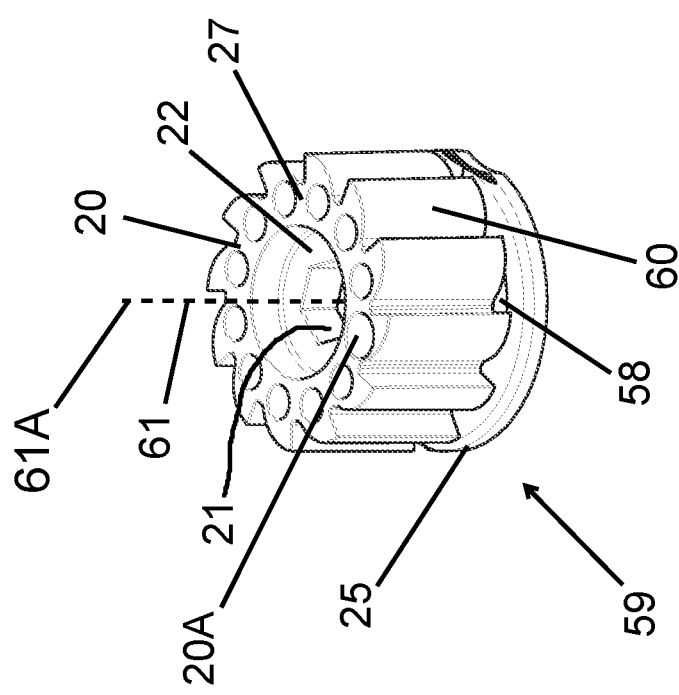
FIG. 5 is a perspective view of a ratchet spool for use with the winding assembly.
Figure 15:
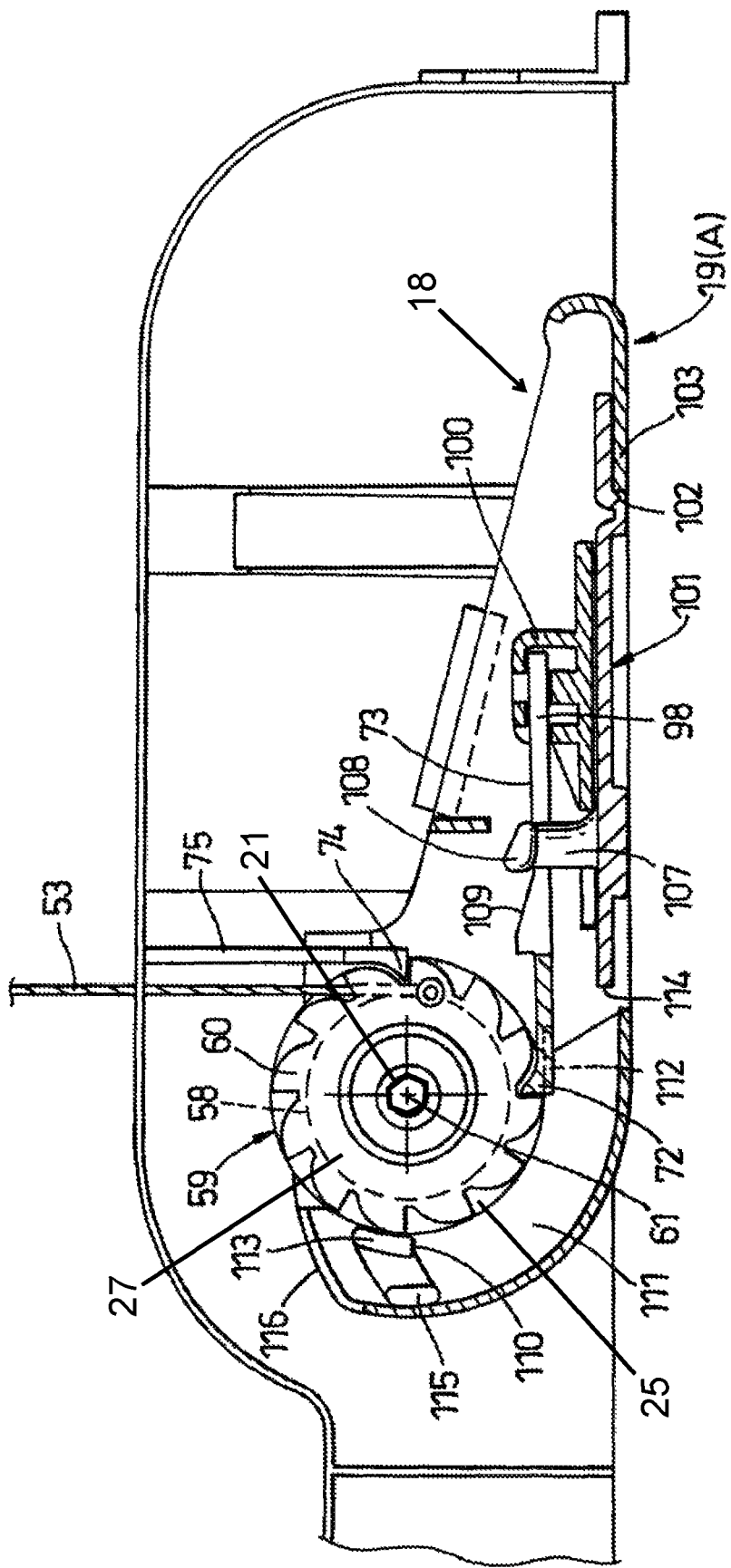
FIG. 15 is a sectional view through the lever, showing the lever in a rest position.
Figure 16:
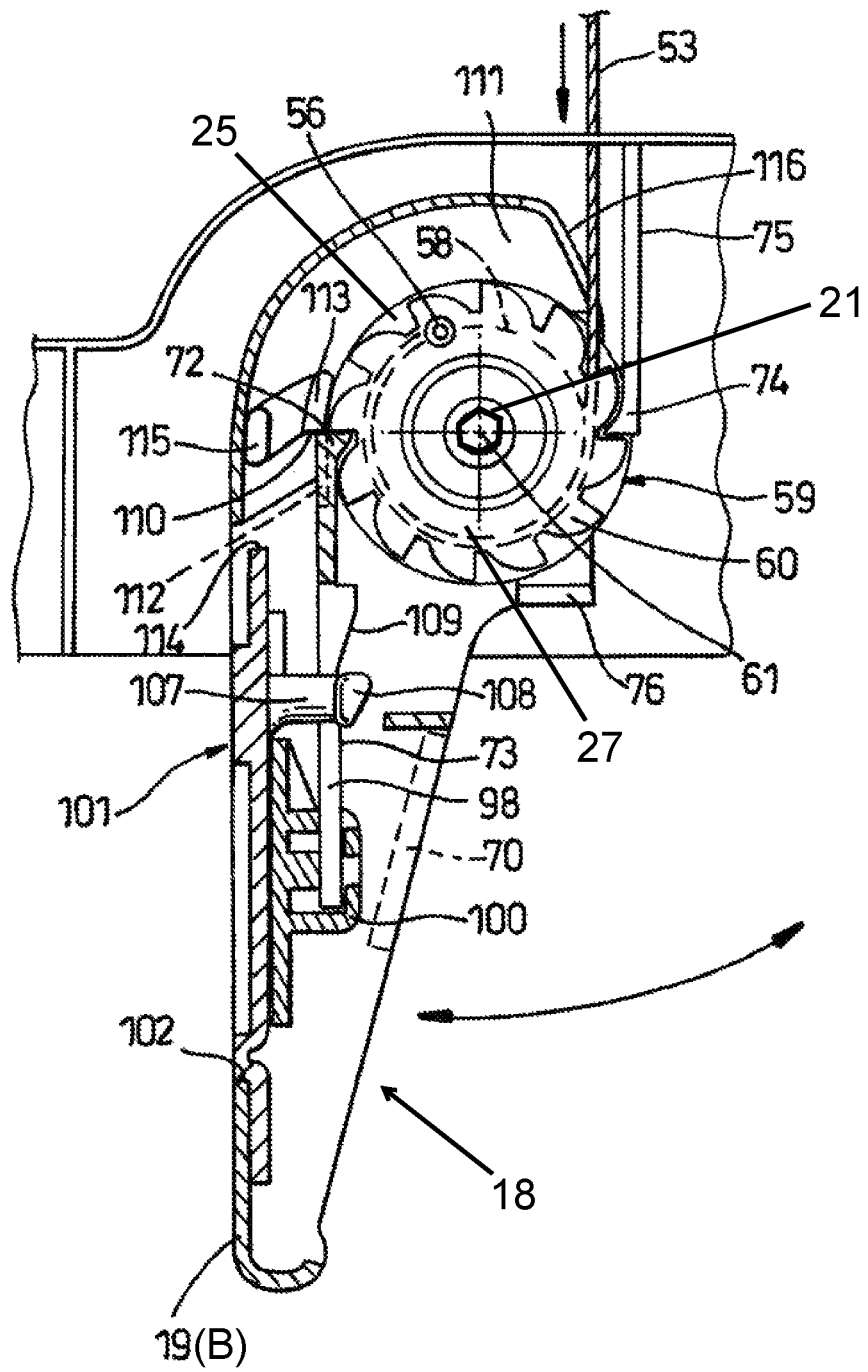
FIG. 16 is a sectional view through the lever, showing the lever in a projecting position.
Figure 17:
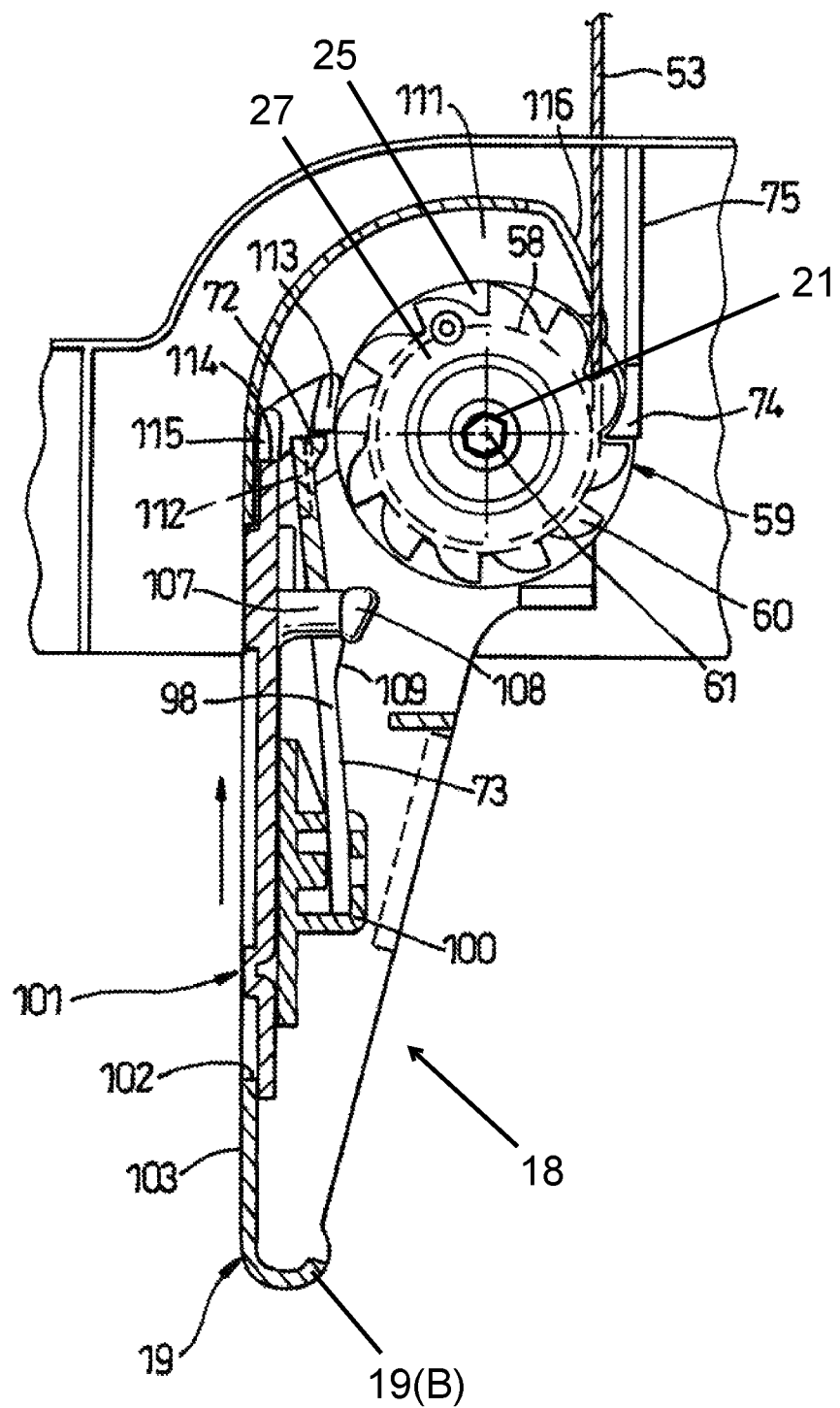
FIG. 17 is a sectional view through the lever, showing the lever in a drive pawl-releasing condition.

The lever 19 is operated by being pivotally moved about a principal axis 61 from a rest position 19(A) (see FIGS. 2, 3 and 15) to a projecting position 19(B) (see FIGS. 4, 16 and 17). The lever 19 has a drive pawl 72 (see FIGS. 15 to 18) to engage the ratchet teeth 60 and drive the ratchet spool 59.

A first return element in the form of a first coil spring 67 is provided between the lever 19 and the body 4 to return the lever from the projecting position 19(B) to the rest position 19(A).

Figure 13:
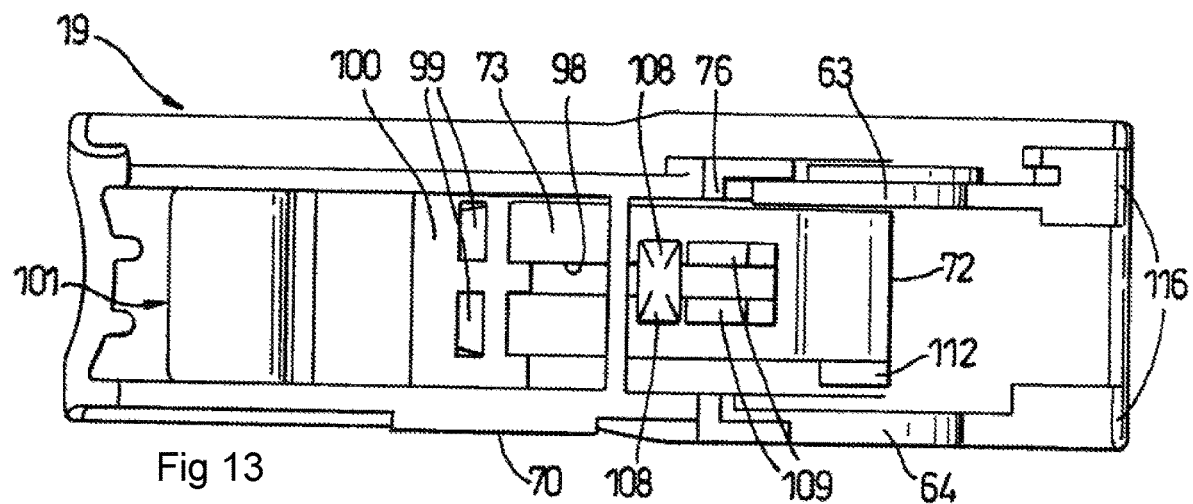
FIG. 13 is a view from the rear of the lever showing the release slider and driving pawl.
Figure 14:
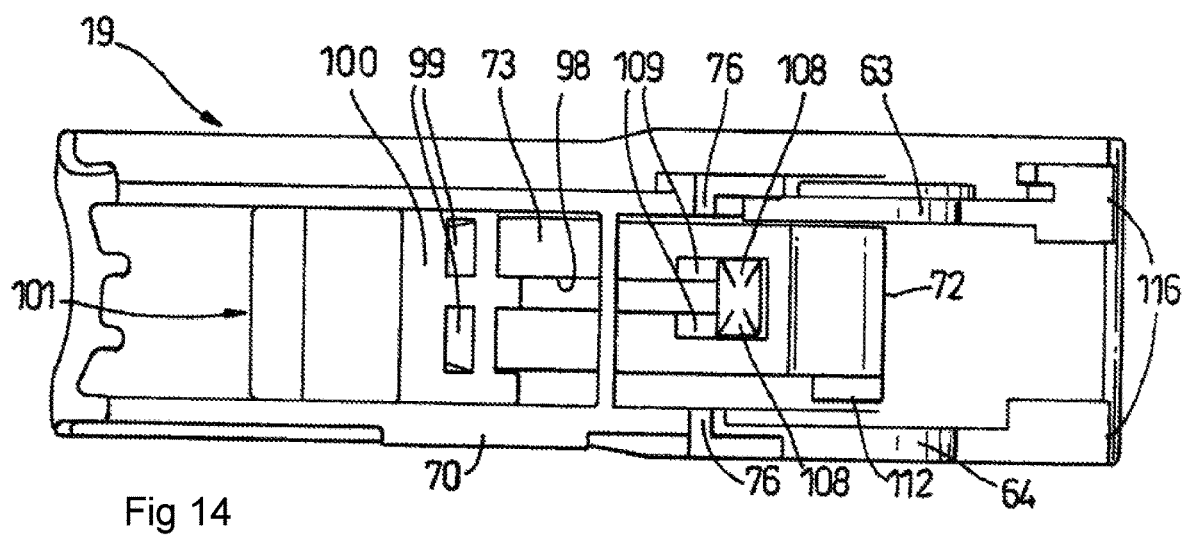
FIG. 14 is a view similar to the view shown in FIG. 13 but with the slider in a pawl-releasing position.

The lever 19 is bifurcated to provide upper and lower flanks 63, 64 (see particularly FIGS. 13 and 14). The opposite ends of the first coil spring 67 respectively engage the body 4 and the upper flank 63, thereby urging the lever 19 towards the rest position 19(A). The ratchet spool 59 is disposed between the upper and lower flanks 63, 64.

The main part 20 of the ratchet spool 59 has a drive formation in the form of a hexagonal recess 21. The hexagonal recess is defined in a face 22 at an upper end of the main part 20. The hexagonal recess 21 is defined within the main part 20, and allows the ratchet spool 59 to be rotated by a tool, such as a hex key or an electric tool capable of driving a hex key. The hexagonal recess 21 is defined on and aligned with the principal axis 61. The hexagonal recess has an axis 61A that extends co-axially or co-linearly with the principal axis 61.

Thus, the ratchet spool 59 is rotatable about the principal axis 61, either by movement of the lever 19 from the rest position 19(A) to the projecting position 19(B), or by rotation of the key inserted into the hexagonal recess 21.

The slotted member 37 has an elongate spindle 40 defining a slot 38 through which the strap 10 passes. The slotted member 37 also has a ribbed portion 49 on the spindle 40, and a second attaching formation in the form of a second annular groove formation 42. The ribbed portion 49 is provided between the second annular groove formation 42 and the spindle 40.

A transmission arrangement in the form of a flexible elongate linkage 53 extends between the ratchet spool 59 and the slotted member 37, thereby linking the ratchet spool 59 to the slotted member 37.

Figure 7:
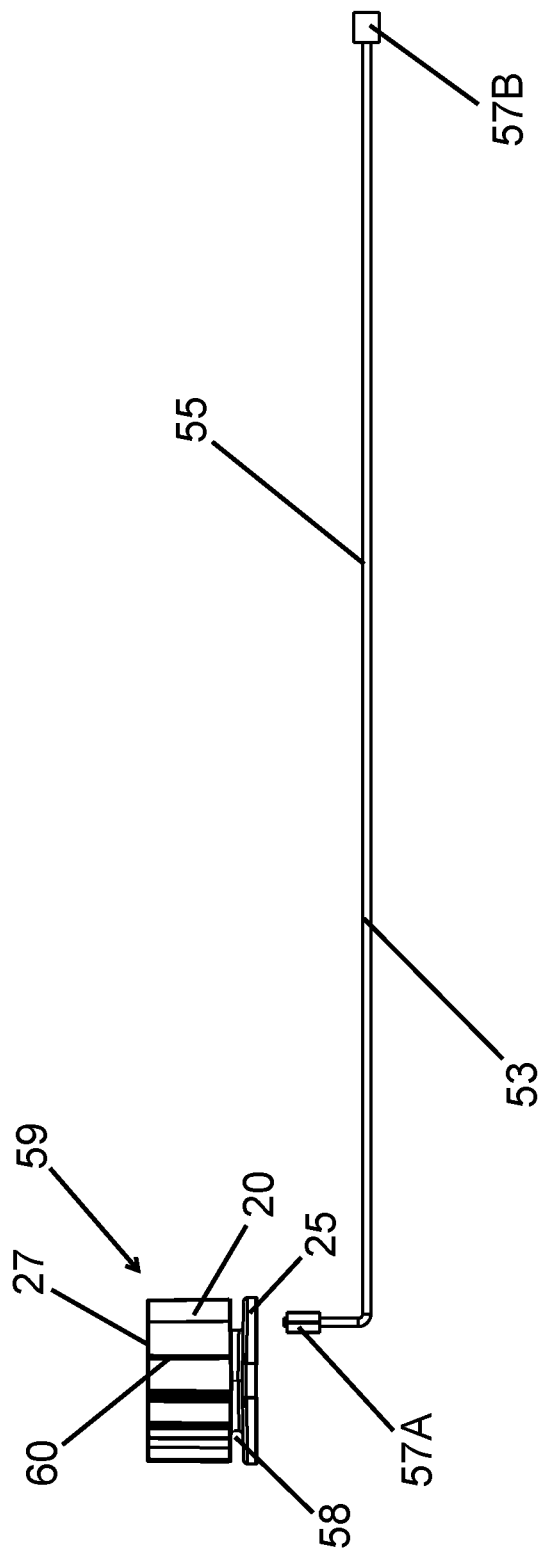
FIG. 7 is a side view showing the ratchet spool and a transmission arrangement separate from each other.

As shown in FIG. 7, the elongate linkage 53 comprises an elongate portion 55, a first connecting member 57A is provided at one end of the elongate portion 55. A second connecting member 57B is provided at the opposite end of the elongate portion 55. 58

The main part 20 defines a through bore 20A, which opens into the first annular groove formation 58. The first connecting member 57A is received in the through bore to connect the elongate linkage 53 to the ratchet spool 59. The second connecting member 57B is received in a hole (not shown) defined by the second annular groove formation 42 of the slotted member 37.

One end of the flexible elongate linkage is attached to the ratchet spool 59. The opposite end of the flexible elongate linkage 53 is attached to the slotted member 37. The flexible elongate linkage 53 is in the form of a wire rope, and is wound around the first and second annular groove formations 58, 42, as discussed in more detail below.

Movement of the lever 19 from the rest position 19(A) (FIGS. 3 and 15) to the projecting position 19(B) (FIGS. 4 and 16) winds the flexible elongate linkage 53 from the slotted member 37 onto the ratchet spool 59. This causes rotation of the slotted member 37, to effect winding of the strap 10 around the spindle 40. When the hook 14 is engaged with the pallet 3, tension is developed in the strap 10 by the winding of the strap 10 around the spindle 40.

The slotted member 37 is rotatably held in the body 4 by three bearings 41, two of which (designated 41A) receive respective opposite ends of the spindle 40, adjacent the slot 38. Another of the bearings 41B receives the end 39 of the slotted member 37 adjacent the second annular groove formation 42.

A second return element in the form of a second coil spring 48 encircles the ribbed portion 49 of the slotted member 37 (see FIGS. 2, 3 and 4).

The opposite ends of the second coil spring 48 respectively engage the body 4 and the ribbed portion 49, thereby urging the slotted member 37 to the position shown in FIGS. 2 and 3 in which the strap 10 is not wound around the spindle 40 and can pass through the slot 38.

Referring to FIGS. 8 to 18, the lever 19 has a first resilient arm 73 to which the drive pawl 72 is attached. The body 4 carries a latching pawl 74 (see FIGS. 15 to 18) on a second resilient arm 75.

When the lever 19 is moved from the rest position 19(A) to the projecting position 19(B), the drive pawl 72 engages one of the ratchet teeth 60 to rotate the ratchet spool 59. This winds the flexible elongate linkage 53 onto the first annular groove formation 58 of the ratchet spool 59, thereby rotating the slotted member 37 to wind the strap 10 around spindle 40.

As the ratchet spool 59 is rotated by the lever 19, the resilient arm 75 deforms so that the latching pawl 74 can move out of the way of the ratchet teeth 60. This allows the ratchet teeth 60 to move across the latching pawl 72 as the ratchet spool 59 rotates.

When the lever 19 reaches the projecting position 19(B), the latching pawl 74 engages one of the ratchet teeth 60.

The lever 19 can then be returned to the rest position. The resilient arm 73 deforms so that the drive pawl 72 can move out of the way of the ratchet teeth 60, to allow the ratchet teeth 60 to move across the drive pawl 72. As the lever 19 returns to the rest position, the engagement of the latching pawl 74 with one of the ratchet teeth prevents movement of the ratchet spool 59.

The lever 19 can be oscillated between the rest and projection positions to cause the ratchet spool 59 (as indicated by the double headed arrows in FIGS. 4 and 16) to wind the flexible elongate linkage 53 into the first annular groove formation 58 from the second annular groove formation 42. This rotates the spindle 40 to wind the strap on to the slotted member 37, thereby tensioning the strap 10 against the pallet 3.

If the user believes that employing the lever 19 to rotate the ratchet spool 59 takes too long, the user can, instead, employ an electric driving tool having a hex key.

The hex key can be inserted into the hexagonal recess 21, and the tool then operated to rotate the ratchet spool 59. By employing an electric tool, the ratchet spool 59 can be rotated much more quickly than employing the lever 19.

Referring to FIGS. 8 to 14, a slider 101 is inserted through an aperture 102 in the outer face 103 of the lever 19. The slider 101 has an angled corner 104 matching one side 105 of a V-shaped end to the aperture 102 to facilitate insertion of the slider 101.

The first resilient arm 73, carrying the drive pawl 72, is divided by a long slot 98. The divided ends 99 are a snap-fit into a block 100 formed integrally within the lever 19.

The slider 101 is provided with a head 106 on a neck 107 passing through the slot 98 in the arm 73, the divided ends 99 of the arm 73 being inserted either side of the neck on the already inserted slider and then into the block 100.

The head 106 has lateral projections 108 engaging ramps 109 on each side of the slot 98 when the slider is moved towards the drive pawl 72 to disengage the drive pawl from the ratchet 60.

Figure 8:
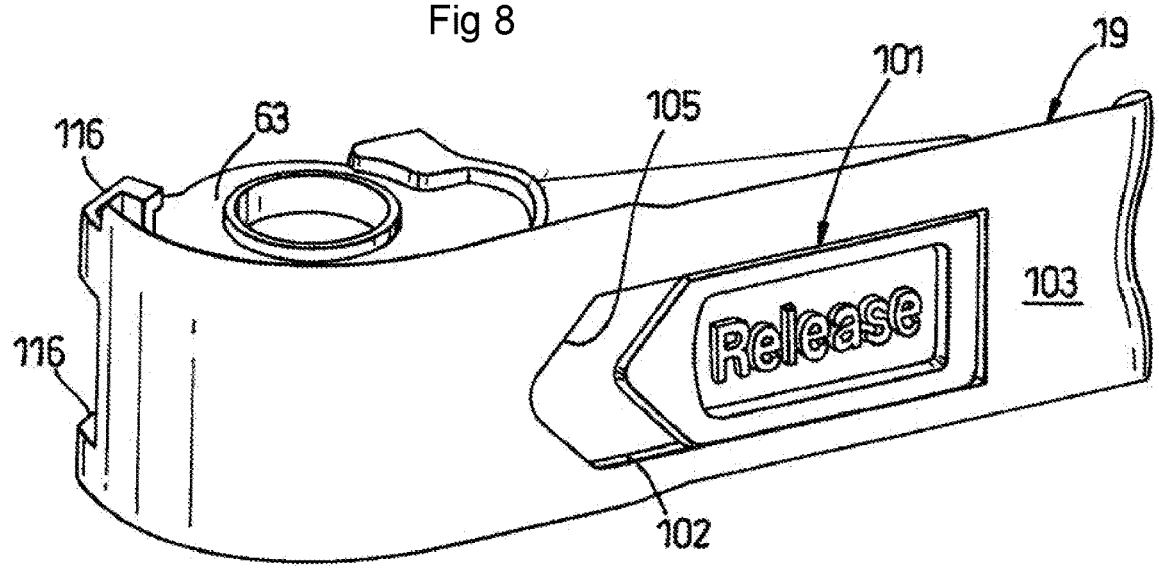
FIG. 8 is a view from the front and above of a lever for use in the winding assembly.
Figure 9:
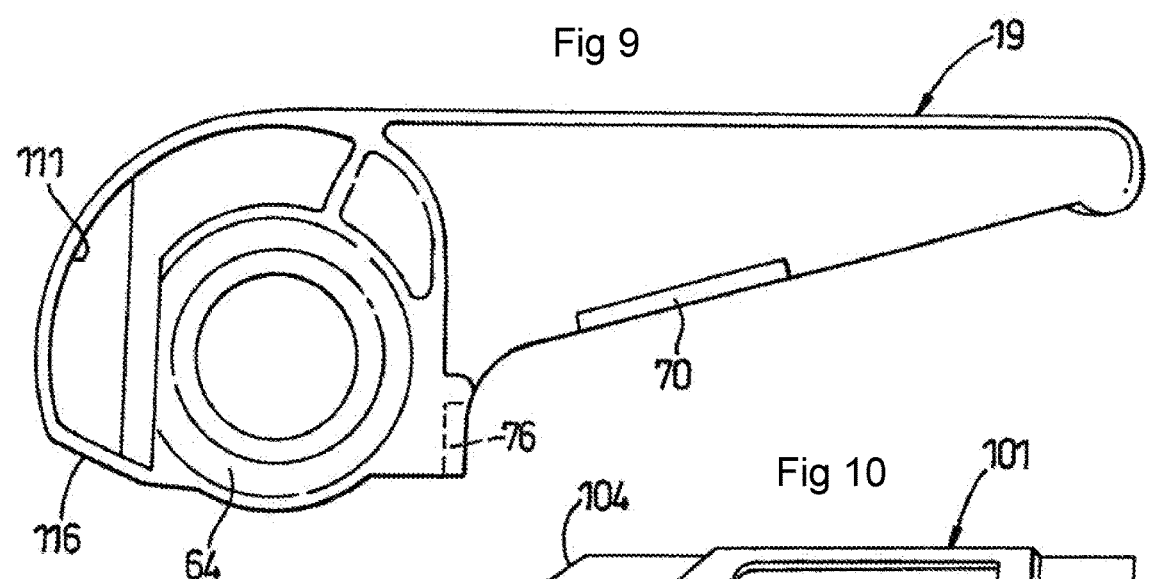
FIG. 9 is a view from below of the lever.
Figure 10:
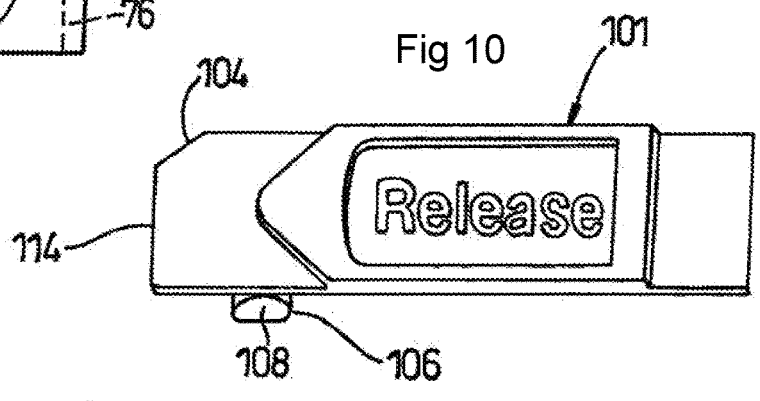
FIG. 10 is a view from the front of a release slider for use with the lever.
Figure 11:
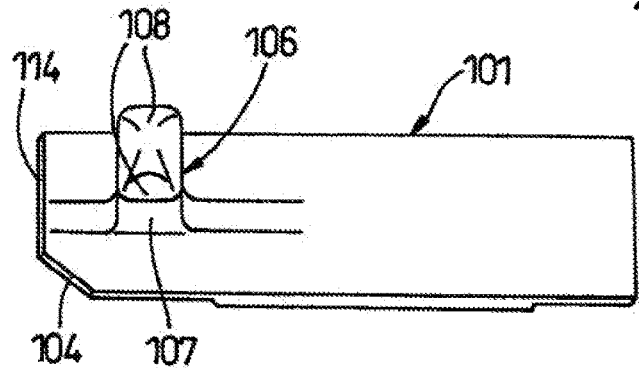
FIG. 11 is a view from the rear of the release slider.
Figure 12:
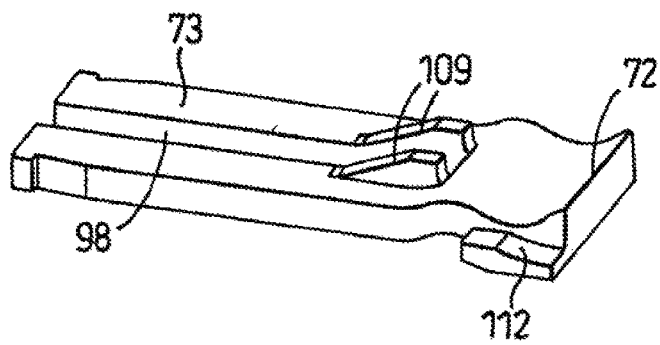
FIG. 12 is a view of a driving pawl for use with the lever.

With the slider in the position shown in FIGS. 8, 12 and 15 and also in FIG. 16, the drive pawl 72 is in engagement with the ratchet teeth 60, thus enabling the lever 19 to be swung repeatedly between the rest and projecting positions 19(A) and 19(B) to rotate the ratchet spool 59.

The position 19(B) is determined by the drive pawl 72 meeting a fixed stop 110 (see FIG. 16) on the body 4 projecting up through an arcuate slot 111 in the lower flank 64 of the lever 19, the actual contact being between the stop and a small heel 112 projecting downwards from the drive pawl 72.

The stop 110 is at one end of a radius plate 113. When the slider 101 is moved to the position shown in FIGS. 14 and 17, the lateral projections 108 of the head 106 engage the ramps 109 on the resilient arm 73.

This engagement between the ramps 109 and the lateral projections 108 causes the resilient arm 73 to flex as shown in FIG. 17 and disengage the drive pawl 72 from the ratchet teeth 60.

Figure 18:
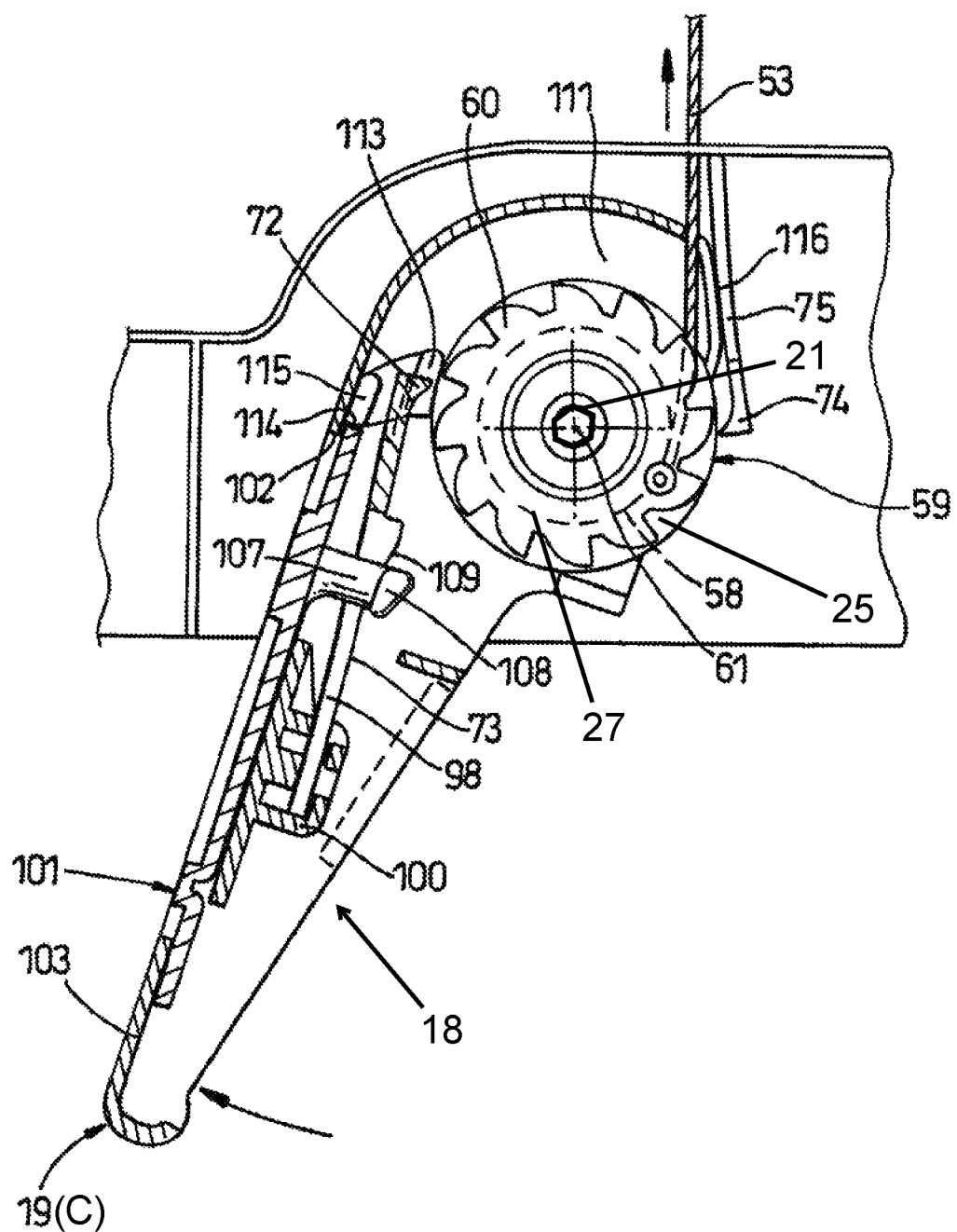
FIG. 18 is a sectional view through the lever, showing the lever in a latching pawl-releasing condition.

The lever 19 can then be moved towards a position 19(C) shown in FIG. 18 causing two things to happen:
  firstly, the leading edge 114 of the slider 101 meets a fixed abutment 115 on the base of the chassis spaced from the fixed stop 110 to urge the slider back towards its inoperative position; and
  secondly, the cam surfaces 116 on the lever 19 flex the second resilient arm 75 to disengage the latching pawl 74 from the ratchet.

The consequence of this latter interaction is that the second coil spring 48 around the rib portion 49 rotates the slotted member 37 to rewind the wire rope 53 on to the second annular groove formation 42 from the first annular groove formation 58.

This interaction also has the effect of unwinding the strap 10 from around the spindle 40 to release the tension in the strap 10, thus allowing the hook 14 to be pulled clear from the pallet 3.

When the strap 10 has been completely unwound from spindle 40, the strap 10 is then free to be rewound on to the drum 12 by the spring acting thereon.

Finally, when the lever 19 is released by the user, the first coil spring 67 returns the lever to the position shown in FIGS. 3 and 15.

Various modifications can be made without departing from the scope of the invention. For example, in the ratchet spool 59 shown in FIGS. 5 to 7, the hexagonal recess 21 is defined in the centre of the upper face 22 of the main part 20 of the ratchet spool 59. Alternatively, the hexagonal recess could be defined in a drive member, as explained below.

Figure 19:
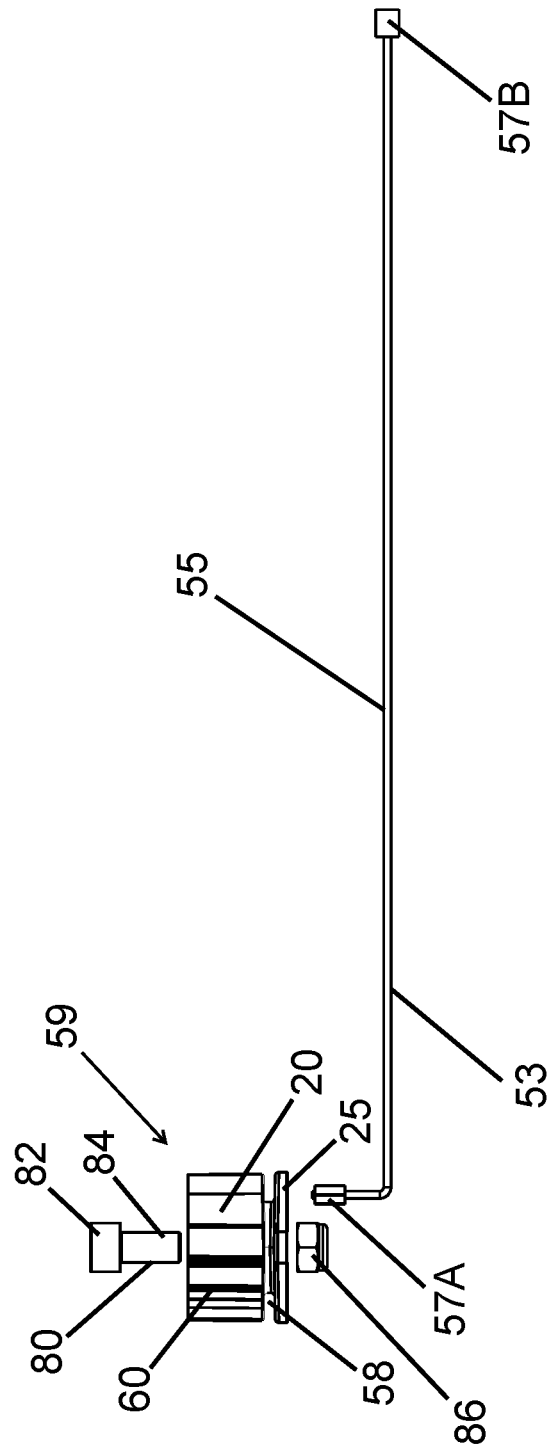
FIG. 19 is an exploded side view showing a further ratchet spool and a transmission arrangement separate from each other.
Figure 20:
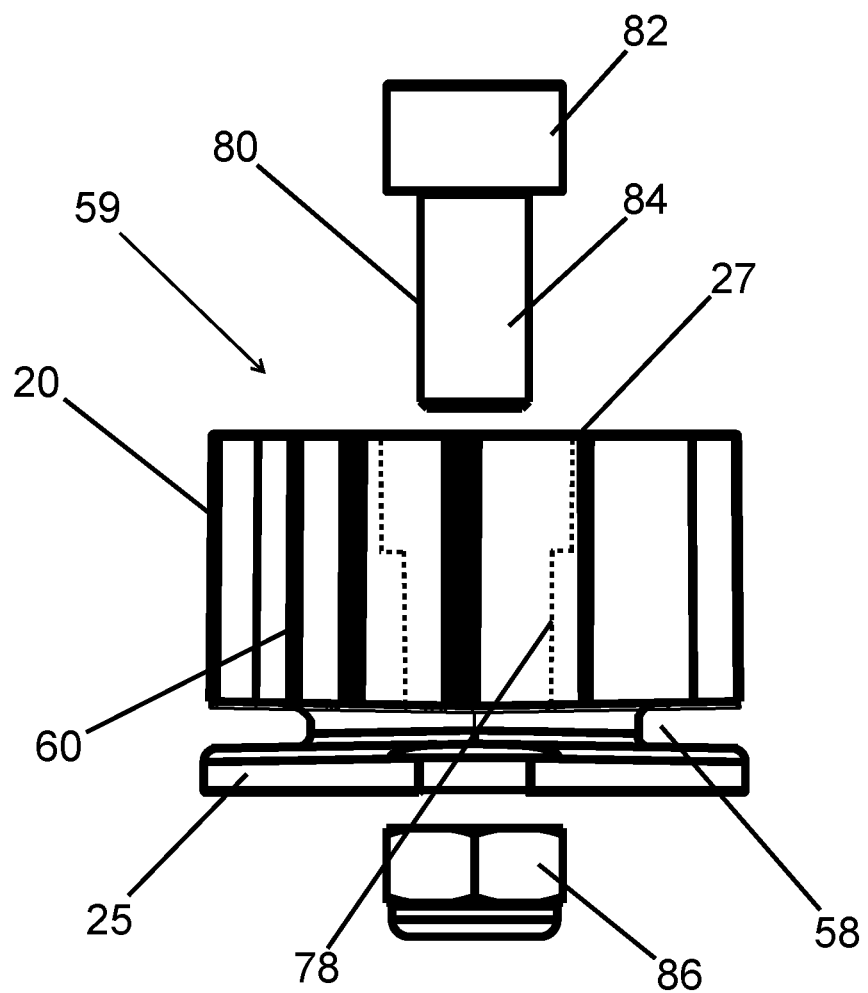
FIG. 20 is a close up view of the further ratchet spool.
Figure 21:
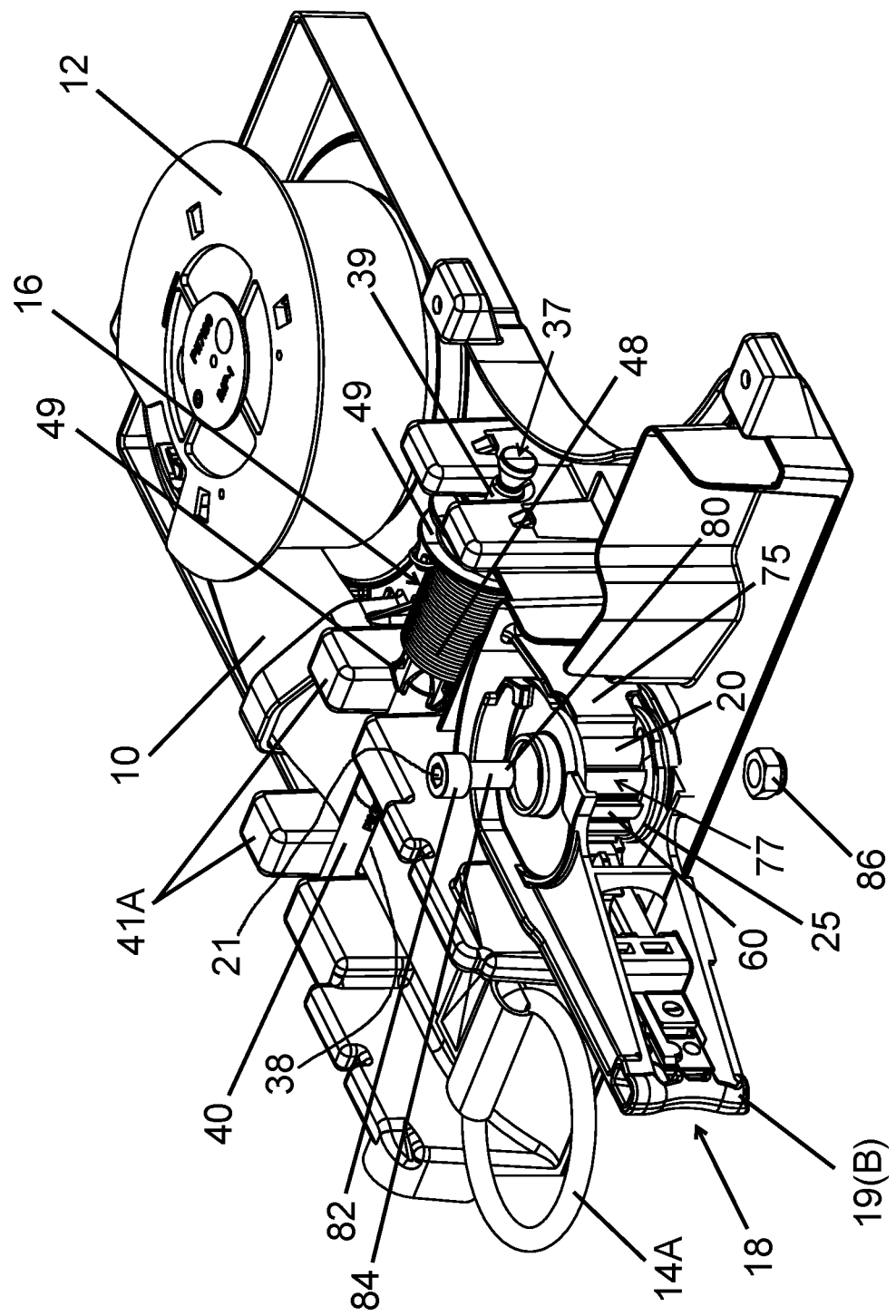
FIG. 21 is a perspective view of a winding assembly incorporating the ratchet spool shown in FIGS. 19 and 20.

Another ratchet spool, generally designated 77, is shown in FIGS. 19, 20 and 21. The ratchet spool 77 can be used in place of the ratchet spool 59 in the winding assembly 16.

The ratchet spool 77 includes many of the features of the ratchet spool 59. These features have been designated in FIGS. 19, 20 and 21 with the same reference numerals as the corresponding features shown in FIGS. 1 to 18.

In the ratchet spool 77, the main part 20 defines a through hole 78 (shown with broken lines in FIG. 20). The base portion 25 defines a central aperture 79 aligned with the through hole 78. A drive member in the form of a bolt 80 extends through the hole 78 and the aperture 79.

The bolt 80 has a head 82 defining the hexagonal recess 21. The bolt 80 has a threaded shaft 84, and is secured to the main part 20 by a nut 86 threaded onto the shaft 84. Thus, the hexagonal recess 21 is defined within the main part 20 by the bolt 80 secured thereto.

When the bolt 80 is secured to the ratchet spool 77, a suitable hex key can be inserted in the hexagonal recess 21 to rotate the bolt 80 and, thereby, rotate the ratchet spool 77. This winds the flexible elongate linkage 53 onto the first annular groove formation 58 of the ratchet spool 59, thereby rotating the slotted member 37 to wind the strap 10 around spindle 40.

The invention claimed is:

1. A ratchet spool for use in a winding assembly, said ratchet spool being rotatable about a principal axis, and said ratchet spool comprising:
  a main part;
  a plurality of ratchet teeth arranged circumferentially around the main part, the teeth being engageable by a ratchet arrangement for driving the ratchet spool in a driving direction about said principal axis; and
  a drive recess for driving the ratchet spool in said driving direction;
  wherein the main part defines a through hole, and the ratchet spool includes a drive member extending through the hole;
  wherein the drive member has a shaft and a head, the drive recess being defined in the head, and the ratchet spool further includes a fastener arranged on the drive member to secure the drive member to the main part.

2. A ratchet spool according to claim 1, including a first attaching formation to attach a transmission arrangement to the ratchet spool, wherein the first attaching formation comprises a first annular groove formation defined by the main part, the first annular groove formation extending circumferentially around the main part, and wherein the transmission arrangement comprises a flexible elongate linkage.

3. A ratchet spool according to claim 2, wherein the main part comprises a toothed portion and a base portion, the base portion being provided at one end of the toothed portion, and the first attaching formation being defined between the toothed portion and the base portion, the ratchet teeth being provided on the toothed portion.

4. A ratchet spool according to claim 3, wherein the base portion defines a central aperture aligned with the through hole.

5. A ratchet spool according to claim 1, wherein the recess is defined along said principal axis.

6. A ratchet spool according to claim 1, wherein the shaft and the fastener are threaded, the fastener being screwed onto the shaft of the drive member to secure the drive member to the main part.

7. A winding assembly comprising:
  a ratchet spool according to claim 1, the ratchet spool being rotatable about the principal axis;
  a tensioner through which an elongate member can extend;
  a flexible elongate linkage between the ratchet spool and the tensioner;
  wherein the ratchet spool has a first annular groove formation to attach the flexible elongate linkage to the ratchet spool, and the tensioner has a second annular groove formation to attach the flexible elongate linkage to the tensioner; and
  a ratchet arrangement to engage the ratchet teeth of the ratchet spool and rotate the ratchet spool in said driving direction about said principal axis;

wherein rotation of the ratchet spool in said driving direction is transmitted by the flexible elongate linkage to the tensioner to drive the tensioner rotatably in a winding direction to wind the elongate member around the tensioner.

8. A winding assembly according to claim 7, wherein the first annular groove formation is defined by the main part, the first annular groove formation extending circumferentially around the main part.

9. A winding assembly according to claim 8, wherein the linkage is received in the first annular groove formation when the ratchet spool is rotated in the driving direction, the linkage being wound around the first annular groove formation when the ratchet spool is rotated in the driving direction.

10. A winding assembly according to claim 8, wherein the first annular groove formation includes a through bore defined by the main part, the bore opening into the first annular groove formation, and the flexible elongate linkage is received in the bore to attach the flexible elongate linkage to the ratchet spool.

11. A winding assembly according to claim 8, wherein the linkage is extendable around the second annular groove formation.

12. A winding assembly according to claim 11, wherein the linkage is windable around the second annular groove formation.

13. A winding assembly according to claim 7, wherein the ratchet arrangement comprises a lever and a pawl to engage the ratchet teeth, the lever being movable from an inoperative position to an operative position, and movement of the lever from the inoperative position to the operative position causes the lever to effect movement of the pawl into engagement with the ratchet teeth.

14. A winding assembly according to claim 13, wherein the lever is pivotally movable about the principal axis.

15. A winding assembly according to claim 13, including a first return element for returning the lever to the inoperative position, and further including a second return element for rotating the tensioner in the opposite direction to the winding direction.

16. A winding assembly according to claim 15, wherein the first return element comprises a first coil spring, and the second return element comprises a second coil spring.

17. A lid comprising:
a body;
an elongate member within the body, the elongate member being movable between a retracted condition in which the elongate member is retracted within the body, and an extended condition in which the elongate member extends from the body; and
a winding assembly as claimed in claim 7, operable on the elongate member.

18. A ratchet spool for use in a winding assembly, said ratchet spool being rotatable about a principal axis, and said ratchet spool comprising:
a main part;
a plurality of ratchet teeth arranged circumferentially around the main part, the teeth being engageable by a ratchet arrangement for driving the ratchet spool in a driving direction about said principal axis;
a drive recess for driving the ratchet spool in said driving direction;
wherein the main part defines a through hole, and the ratchet spool includes a drive member extending through the hole;
wherein the drive member has a shaft and a head, the drive formation being defined in the head, and the ratchet spool further includes a fastening member arranged on the drive member to secure the drive member to the main part; and
wherein the shaft and the fastening member are threaded, the fastening member being screwed onto the shaft of the drive member to secure the drive member to the main part.

* * * * *